United States Patent
Wang

(10) Patent No.: US 7,308,153 B1
(45) Date of Patent: *Dec. 11, 2007

(54) WEIGHTED ABSOLUTE DIFFERENCE BASED NOISE REDUCTION METHOD AND APPARATUS

(75) Inventor: Zhongde Wang, Camas, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/462,968

(22) Filed: Aug. 7, 2006

Related U.S. Application Data

(63) Continuation of application No. 10/268,219, filed on Oct. 9, 2002, now Pat. No. 7,110,612.

(60) Provisional application No. 60/328,756, filed on Oct. 11, 2001.

(51) Int. Cl.
    *G06K 9/40* (2006.01)
    *H04N 5/00* (2006.01)

(52) U.S. Cl. ........................ 382/262; 348/607

(58) Field of Classification Search ............... 382/162, 382/167, 176, 264, 266, 275, 282; 348/607, 348/618, 619, 620, 621, 622, 623, 699, 700, 348/447, 463, 625
See application file for complete search history.

(56) References Cited

U.S. PATENT DOCUMENTS

| | | | |
|---|---|---|---|
| 4,734,770 A | 3/1988 | Matsuba | |
| 4,827,533 A | 5/1989 | Tanaka | |
| 4,937,667 A | 6/1990 | Choquet et al. | |
| 4,967,271 A | 10/1990 | Campbell et al. | |
| 4,982,280 A | 1/1991 | Lyon et al. | |
| 5,019,903 A | 5/1991 | Dougall et al. | |
| 5,070,403 A | 12/1991 | Wilkinson | |
| 5,245,677 A | 9/1993 | Lepore et al. | |
| 5,339,109 A | 8/1994 | Hong | |
| 5,347,559 A | 9/1994 | Hawkins et al. | |
| 5,475,438 A | 12/1995 | Bretl | |
| 5,519,451 A | 5/1996 | Clatanoff et al. | |
| 5,532,751 A | 7/1996 | Lui | |
| 5,592,231 A | 1/1997 | Clatanoff et al. | |
| 5,594,816 A | 1/1997 | Kaplan et al. | |
| 5,786,862 A | 7/1998 | Kim et al. | |
| 5,796,437 A | 8/1998 | Muraji et al. | |

(Continued)

OTHER PUBLICATIONS

T. Doyle; *Interlaced to Sequential Conversion for EDTV Applications*; 1988; pp. 421-430.

*Primary Examiner*—Yon J. Couso
(74) *Attorney, Agent, or Firm*—Marger Johnson & McCollom P.C.

(57) ABSTRACT

The invention is a method and apparatus for reducing noise in an image. The method and apparatus involves calculating a plurality of directional operators, comparing the directional operators to a predetermined threshold, and applying a filter responsive to the comparing. The method and apparatus computes the directional operators by taking a weighted sum of the absolute differences between a target pixel and its surrounding pixels. The comparison signals to the method or apparatus the existence of a line or edge. If the method or apparatus detects no edge or line, the method applies a smoothing or averaging filter. If the method or apparatus detects an edge or line, the method applies a median filter in the direction with a minimum directional difference.

23 Claims, 9 Drawing Sheets

U.S. PATENT DOCUMENTS

| | | |
|---|---|---|
| 5,844,614 A | 12/1998 | Chong et al. |
| 5,943,099 A | 8/1999 | Kim |
| 5,959,693 A | 9/1999 | Wu et al. |
| 6,055,018 A | 4/2000 | Swan |
| 6,061,100 A | 5/2000 | Ward et al. |
| 6,067,125 A | 5/2000 | May |
| 6,072,531 A | 6/2000 | Shibano |
| 6,094,508 A | 7/2000 | Acharya et al. |
| 6,118,488 A | 9/2000 | Huang |
| 6,181,382 B1 | 1/2001 | Kieu et al. |
| 6,222,589 B1 | 4/2001 | Faroudja et al. |
| 6,229,578 B1 | 5/2001 | Acharya et al. |
| 6,512,550 B1 | 1/2003 | De Garrido et al. |
| 6,859,235 B2 | 2/2005 | Walters |
| 2002/0075400 A1 | 6/2002 | Shin et al. |
| 2003/0081144 A1 | 5/2003 | Mohsenian |

$$S_h = \begin{array}{|c|c|c|} \hline -1 & -2 & -1 \\ \hline 0 & 0 & 0 \\ \hline 1 & 2 & 1 \\ \hline \end{array}$$

Figure 2A $$S_v = \begin{array}{|c|c|c|} \hline -1 & 0 & 1 \\ \hline -2 & 0 & 2 \\ \hline -1 & 0 & 1 \\ \hline \end{array}$$

Figure 2B $$S_d = \begin{array}{|c|c|c|} \hline 0 & 1 & 2 \\ \hline -1 & 0 & 1 \\ \hline -2 & -1 & 0 \\ \hline \end{array}$$

Figure 2C $$S_a = \begin{array}{|c|c|c|} \hline -2 & -1 & 0 \\ \hline -1 & 0 & 1 \\ \hline 0 & 1 & 2 \\ \hline \end{array}$$

Figure 2D $$L_h = \begin{array}{|c|c|c|} \hline -1 & -1 & -1 \\ \hline 2 & 2 & 2 \\ \hline -1 & -1 & -1 \\ \hline \end{array}$$

Figure 3A $$L_v = \begin{array}{|c|c|c|} \hline -1 & 2 & -1 \\ \hline -1 & 2 & -1 \\ \hline -1 & 2 & -1 \\ \hline \end{array}$$

Figure 3B $$L_d = \begin{array}{|c|c|c|} \hline 2 & -1 & -1 \\ \hline -1 & 2 & -1 \\ \hline -1 & -1 & 2 \\ \hline \end{array}$$

Figure 3C $$L_a = \begin{array}{|c|c|c|} \hline -1 & -1 & 2 \\ \hline -1 & 2 & -1 \\ \hline 2 & -1 & -1 \\ \hline \end{array}$$

Figure 3D $$I = \begin{array}{|c|c|c|} \hline 62 & 80 & 70 \\ \hline 70 & 60 & 70 \\ \hline 50 & 80 & 60 \\ \hline \end{array}$$

The amplitude response of
Sobel mask Sv for a vertical line

The amplitude response of line
detector Lv for a vertical line

The amplitude response of
vertical operator (Dmax-Dv) of
the invention for a vertical line The amplitude response of Sobel
mask Sv for a vertical edge The amplitude response of line
detector Lv for a vertical edge The amplitude response of
vertical operator (Dmax-Dv) of
the invention for a vertical edge The amplitude response of Sobel mask Sv for a horizontal ramp The amplitude response of line detector Lv for a horizontal ramp The amplitude response of vertical operator (Dmax-Dv) of the invention for a horizontal ramp

WEIGHTED ABSOLUTE DIFFERENCE BASED NOISE REDUCTION METHOD AND APPARATUS

This application is a continuation of U.S. non-provisional patent application Ser. No. 10/268,219, filed Oct. 9, 2002, now granted as U.S. Pat. No. 7,110,612 issued on Sep. 19, 2006, and claims priority from U.S. provisional patent application Ser. No. 60/328,756, filed Oct. 11, 2001, incorporated herein by reference.

BACKGROUND OF THE INVENTION

1. Field of the Invention

The invention relates to a weighted absolute difference based noise reduction method and apparatus for adaptively improving image quality.

2. Description of the Related Art

Noise is a disturbance, especially a random and persistent disturbance that obscures or reduces the clarity of a signal. In display and printer technologies, noise degrades quality because it produces artifacts on the displayed or printed image. There are two distinct types of noise, each distinguished by amplitude. The first includes Gaussian noise, Poison noise, uniform noise, and the like. We refer to the first type of noise collectively as Gaussian noise. Gaussian noise amplitude spreads to a full range of gray scale and is inherent in most electronic communication systems. The second type of noise is termed salt and pepper noise because it leaves black or white spots randomly spread on the image. Scratches or dust on recording media and digital transmission errors often cause salt and pepper noise.

An averaging or smoothing filter reduces Gaussian noise by averaging the gray level difference between a target pixel and surrounding pixels. Unfortunately, averaging blurs the image.

A median filter reduces Gaussian and salt and pepper noise without blurring the image. The median filter, however, removes lines that are oriented differently than it and whose width is less than half its size. For example, a three point horizontal median filter will remove vertical and diagonal lines that are one pixel wide. A three point vertical median filter will remove horizontal and diagonal lines that are one pixel wide and so on. The result is perhaps clearer but distorted images.

Accordingly, a need remains for a single process effective at reducing both Gaussian and salt and pepper noise.

BRIEF DESCRIPTION OF THE DRAWINGS

The foregoing and other objects, features, and advantages of the invention will become more readily apparent from the detailed description of an embodiment that references the following drawings.

FIGS. 2A-2D are horizontal, vertical, diagonal, and anti-diagonal Sobel mask diagrams FIGS. 3A-3D are horizontal, vertical, diagonal, and anti-diagonal line detector diagrams.

FIG. 4 is a sample sub image.

FIG. 7 is a 3 by 3 sub image.

FIG. 8 is a 3 by 5 sub image.

DETAILED DESCRIPTION OF THE PREFERRED EMBODIMENT

The present invention relates to a method and apparatus for reducing noise in an image. The method and apparatus exploit a particular filter's effectiveness at noise reduction by first identifying an edge or line in a sub image. The method and apparatus additionally identifies edge and line structures. For example, a horizontal ramp does not generally exhibit lines or edges. Yet vertical edge structures appear on a monitor when the ramp reaches a predetermined inclination. A person of reasonable skill should understand that such edge or line structures come within the meaning of edges or lines described herein.

If an edge or line exists, the method and apparatus applies a median filter along its direction to reduce salt and pepper and Gaussian noise. If an edge or line does not exist, the method and apparatus applies a smoothing or averaging filter to maximally reduce Gaussian noise.

The method and apparatus identifies an edge or line by first computing directional operators or parameters associated with different directions, e.g., horizontal, vertical, diagonal, and anti-diagonal directions. The directional operators are sums of weighted absolute differences between a target pixel and surrounding pixels. If an edge or line exists, the weighted absolute difference along the direction of the edge or line is smaller than the weighted absolute differences along any other direction. The method and apparatus compares the difference between the highest and lowest directional operators. If that difference is greater than a predetermined threshold T, the method and apparatus determines an edge or line exists in the sub image. The method or apparatus then applies a 1-D median filter along the direction indicated by the lowest directional operator. That is, the method or apparatus applies a median filter along the direction of minimum weighted absolute difference. Conversely, if the difference between the highest and lowest directional operators is less than the predetermined threshold T, the method and apparatus concludes no edge or line exists in the sub-image and applies a smoothing or averaging filter to maximally remove Gaussian noise.

The method and apparatus detect an edge or line based on first and second order differences, respectively. First order differences are often called gradients. In image processing, first and second order differences are determined using masks.

Figure 1:
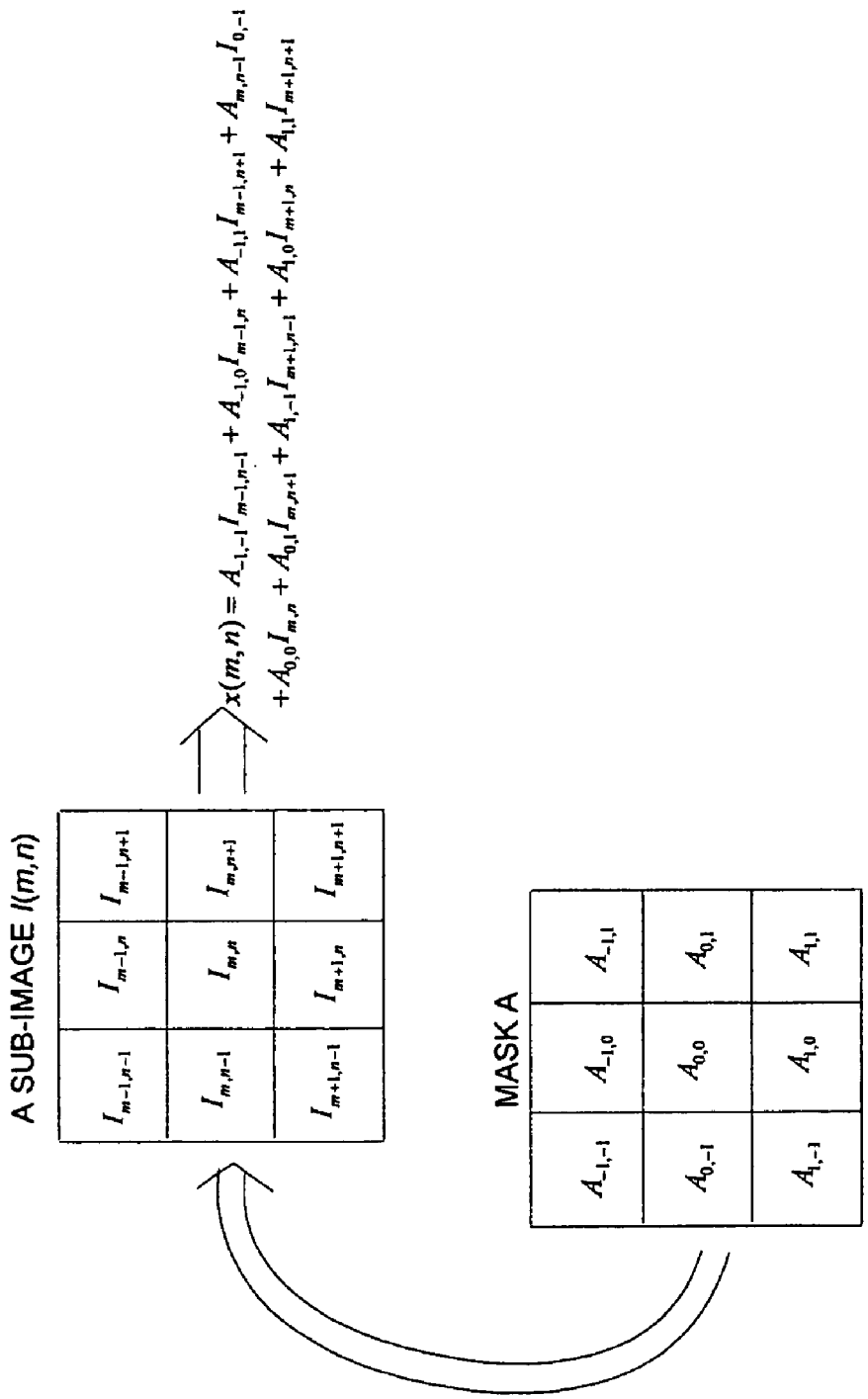
FIG. 1 is a sub image and mask diagram.

Referring to FIG. 1, the output x(m,n) of a sub image I(m,n) centered about (m,n), consisting of nine pixels $I_{m+i,n+j}$, i,j=−1, 0, 1, masked by a mask A is given by the following, where the asterisk represents a masking operation.

$$x(m, n) = A * I(m, n) = \sum_{i,j=-1}^{1} A_{i,j} I_{m+i,n+j}$$

Sobel masks are efficient at detecting edges. A horizontal, vertical, diagonal, and anti-diagonal Sobel masks are shown in FIGS. 2A-2D, respectively. Sobel masks estimate first order differences on a corresponding direction.

Similarly, line detector masks identify lines with a single pixel width. A horizontal, vertical, diagonal, and anti-diagonal line detector masks are shown in FIGS. 3A-3D, respectively. Line detectors estimate second order difference on a corresponding direction, e.g., $L_h$ estimates the second order difference in a horizontal direction, $L_v$ estimates the second order difference in a vertical direction, $L_d$ estimates the second order difference in a diagonal direction, and $L_a$ estimates the second order difference in an anti-diagonal direction.

The principal idea surrounding the use of Sobel masks and line detectors is that an edge or line at a pixel is most likely oriented in a direction with maximum response. For example, if the horizontal Sobel mask $S_h$ has a maximum response, an edge is most likely horizontally aligned. For another example, if the horizontal line detector $L_h$ has a maximum response then the line is most likely horizontally aligned.

In some cases, Sobel masks or line detectors by themselves are insufficient for detecting edges or lines in a sub-image if only four directions are used for classification. FIG. 4 is one such example. The numbers in the squares of FIG. 4 indicate the gray level or luminance of the corresponding pixels. Applying Sobel masks and line detectors to this image yields the following.

| $S_h * I = -22$ | $S_v * I = 18$ | $S_d * I = 20$ | $S_a * I = 2$ |
|---|---|---|---|
| $L_h * I = 2$ | $L_v * I = 58$ | $L_d * I = 56$ | $L_a * I = 62$ |

The application of the four Sobel masks indicates that the edge is most likely horizontally oriented. The application of the four line detectors indicates that the line is most likely anti-diagonally aligned. From direct inspection of the pixel gray levels in the sub image, however, the edge or line appears diagonally oriented because the pixel gray level in the diagonal direction are almost identical (62, 60, 60).

Others have addressed this difficulty with varying results. For example, U.S. Pat. No. 4,734,770 to Matsuba, entitled Image data processing Method and Device Therefor, uses an energy function to separate an edge from a non-edge area. U.S. Pat. No. 5,594,816 to Kaplan et alii, entitled Computer Based Digital Image Noise Reduction Method Based on Over-Lapping Planar Approximation, uses a $\chi$ function to distinguish an edge from a non-edge area. Other related patents include Matsuba (U.S. Pat. No. 4,734,770), Tanaka (U.S. Pat. No. 4,827,533), May et alii (U.S. Pat. No. 6,067,125), Wu et alii (U.S. Pat. No. 5,959,693), Kaplan (U.S. Pat. No. 5,594,816), Acharya (U.S. Pat. No. 6,229,578), and Acharya (U.S. Pat. No. 6,094,508). None of these patents disclose methods or apparatus that identify edge or line areas and reduce both Gaussian and salt and pepper noise within those areas.

Figure 5:
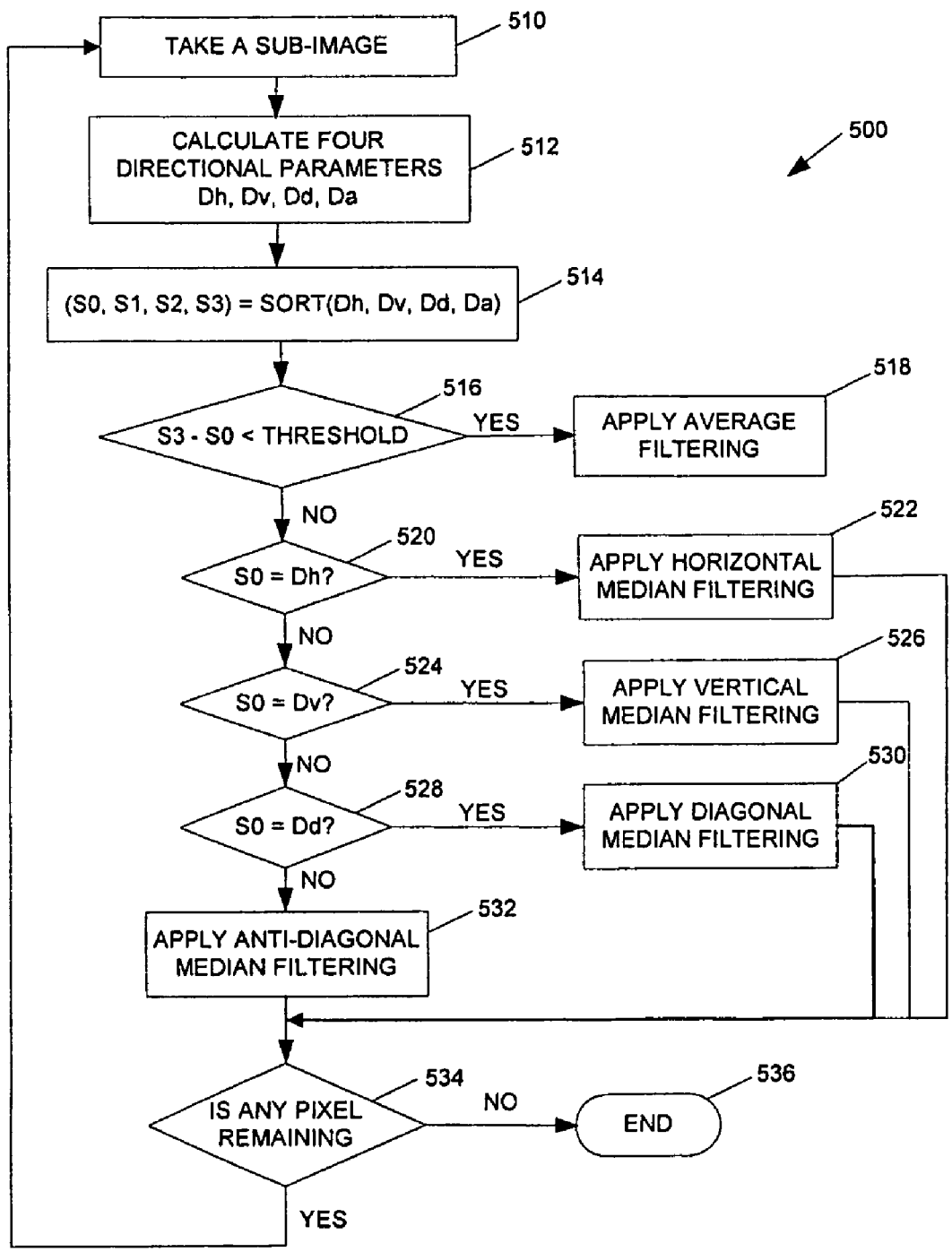
FIG. 5 is a flowchart of an invention embodiment.

FIG. 5 is a flowchart of a method of the present invention. As to the flowchart, each block within the flowchart represents both a method step and an apparatus element for performing the method step. A person of reasonable skill in the art should realize he might implement the various apparatus elements in hardware, software, firmware, or combinations thereof.

The apparatus might be specially constructed for the required purposes or it might comprise a general-purpose computer selectively activated or configured by a computer program stored in the computer. The methods and algorithms presented herein are not necessarily inherently related to any particular computer or other apparatus. Various general-purpose machines might be used with programs in accordance with the teachings herein or it might prove more convenient to construct more specialized apparatus to perform the required steps.

Useful machines or articles for performing the inventive steps include general-purpose digital computers, a special purpose computer, a microprocessor, and the like.

The invention also provides a storage medium that has the program implementing the method of the invention stored thereon. The storage medium is a computer-readable medium, such as a memory, and is read by the computing machine mentioned above.

This detailed description is presented largely in terms of block diagrams, timing diagrams, flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention.

A person having ordinary skill in the art should recognize that the boxes described below might be implemented in different combinations and in different order.

Referring to FIG. 5, the method 500 begins by scanning an image, on a pixel-by-pixel basis, and feeding that image into a processor (not shown). For each pixel, the method takes a sub image centered about that pixel (box 510). In one embodiment, the sub image is a 3 by 3 sub image as shown in FIG. 7. In another embodiment, the sub image is a 3 by 5 sub image as shown in FIG. 8. A person of reasonable skill in the art should recognize that any number of pixels might comprise a sub image.

At box 512, the method calculates a plurality of directional parameters in a corresponding plurality of directions. For example, the method calculates directional parameters $D_h$, $D_v$, $D_d$, and $D_a$, in the horizontal, vertical, diagonal, and anti-diagonal directions, respectively. A person of reasonable skill in the art should recognize that any number of directional parameters in any number of directions come within the scope of the invention.

For a 3 by 3 sub image (FIG. 7), the directional operators are given by the following.

$$D_h = w_0(|p_{11}-p_{10}|+|p_{11}-p_{12}|)+w_1(|p_{01}-p_{00}|+|p_{01}-p_{02}|+|p_{21}-p_{20}|+|p_{21}-p_{22}|);$$

$$D_v = w_0(|p_{11}-p_{01}|+|p_{11}-p_{21}|)+w_1(|p_{10}-p_{00}|+|p_{10}-p_{20}|+|p_{12}-p_{02}|+|p_{12}-p_{22}|);$$

$$D_d = w_2(|p_{11}-p_{00}|+|p_{11}-p_{22}|)+w_3(|p_{01}-p_{12}|+|p_{10}-p_{21}|);$$

and $$D_a = w_2(|p_{11}-p_{02}|+|p_{11}-p_{20}|)+w_3(|p_{10}-p_{01}|+|p_{12}-p_{21}|).$$

Where $w_0$, $w_1$, $w_2$, and $w_3$ are weights and $p_{ij}$ is the luminance or gray level of pixel (i,j).

Directional operators $D_h$, $D_v$, $D_d$, and $D_a$ measure the weighted absolute differences on horizontal, vertical, diagonal, and anti-diagonal directions, respectively. The directional operators closely relate to the gradients or first order differences on those four directions. Since the pixel spacing on diagonal and anti-diagonal directions is $\sqrt{2}$ times of the pixel spacing on horizontal and vertical directions, the weight for the directional parameters on horizontal and vertical directions is about $\sqrt{2}$ times that for the diagonal and anti-diagonal directions. More generally, factors to consider in determining weights include the spacing between pixels, the results of applying low pass filters to the pixels, and easy implementation. On this last factor, it is well known that it is difficult to implement √2 in hardware. In practice, √2 is approximated using a series of integer shifts. Notwithstanding, the weights are $w_0=21/16$, $w_1=21/32$, $w_2=w_3=1$ in one embodiment. A person of reasonable skill in the art should recognize other weights are possible.

At the border of the sub image, the method uses pixels outside of the image to calculate the directional operators $D_h$, $D_v$, $D_d$, and $D_a$. When this occurs, the method assigns zero luminance or gray level to these outside pixels.

For a 3 by 5 sub image (FIG. 8), the directional operators are given by the following.

$$D_h = u_0(|p_{12}-p_{11}|+|p_{12}-p_{13}|)+u_1(|p_{02}-p_{01}|+|p_{02}-p_{03}|+|p_{22}-p_{21}|+|p_{22}-p_{23}|);$$

$$D_v = u_0(|p_{12}-p_{02}|+|p_{12}-p_{22}|)+u_1(|p_{11}-p_{01}|+|p_{11}-p_{21}|+|p_{13}-p_{03}|+|p_{13}-p_{23}|);$$

$$D_d = u_2(|p_{12}-p_{01}|+|p_{12}-p_{23}|)+u_3(|p_{02}-p_{13}|+|p_{11}-p_{22}|)+u_4(|p_{13}-p_{24}|+|p_{00}-p_{11}|);$$

and $$D_a = u_2(|p_{12}-p_{03}|+|p_{12}-p_{21}|)+u_3(|p_{11}-p_{02}|+|p_{13}-p_{22}|)+u_4(|p_{11}-p_{20}|+|p_{04}-p_{13}|);$$

Where $u_0=21/64$, $u_1=21/128$, $u_2=1/4$, $u_3=3/16$, and $u_4=1/16$ and $p_{ij}$ is the luminance or gray level of pixel (i,j).

At box 514, the method sorts the directional parameters as follows.

$$(S_0,S_1,S_2,S_3)=\text{sort}(D_h,D_v,D_d,D_a)$$

Where $S_3 \geq S_2 \geq S_1 \geq S_0$.

At box 516, the method compares the sorted results with a predetermined threshold T. In one embodiment, the method compares the difference between the highest and lowest directional parameter $S_3-S_0$ to the threshold T.

The sorted results might be compared variously with the threshold T. Instead of the comparing $S_3-S_0$, the method might compare $S_3+S_2-S_1-S_0$, $\sqrt{D_h^2+D_v^2}$, $\max(D_h,D_v)+k \min(D_h,D_v)$, $S_3+S_2+k(S_1+S_0)$, where k is a constant, and the like. Some of these comparison parameters are the result of gradient calculations as follows. For a continuous 2-dimensional signal, the gradient is defined by:

$$\nabla f(x,y) = \frac{\partial f(x,y)}{\partial x} i + \frac{\partial f(x,y)}{\partial y} j$$

Where i and j are unit vectors in the x and y directions, respectively.

The gradient in any direction is determined by $$\frac{\partial f(x,y)}{\partial x}$$

and $$\frac{\partial f(x,y)}{\partial y}.$$

The gradient amplitude is given by $$\sqrt{\frac{\partial f(x,y)^2}{\partial x} + \frac{\partial f(x,y)^2}{\partial y}}.$$

Let $D_h$ and $D_v$ be an estimation of $$\frac{\partial f(x,y)}{\partial x}$$

and $$\frac{\partial f(x,y)}{\partial y},$$

respectively. The gradient becomes $\nabla f(x,y)=\sqrt{D_h^2+D_v^2}$.

The formula $\max(D_h,D_v)+k \min(D_h,D_v)$ defines yet another comparison parameter commonly used in line detectors. Other comparison parameters listed above are exemplary and should not be understood as limiting the present invention.

A person of reasonable skill in the art should recognize various ways to compare the sorted (or unsorted) directional parameters to a threshold T.

A person of reasonable skill in the art might variously determine the threshold T including by calculating the threshold T using theoretical image science models or through experimentation.

If $S_3-S_0<T$ (box 516), the method 500 determines the sub-image to be smooth, i.e., devoid of an edge or line, and applies an averaging or smoothing filter to remove Gaussian noise (box 518). For smooth area, the gray level of the target pixel ($p_{11}$ in FIG. 1) is replaced either by the average of the gray level of the sub-image or low pass filtering of the sub-image. For the embodiment shown in FIG. 7, the method 500 replaces the target pixel with an average of its gray level and that of its eight surrounding pixels as follows.

$$p_{out} = \sum_{i,j=0}^{2} p_{ij}/9.$$

If $S_3-S_0 \geq T$ (box 516), the method 500 assumes the sub image includes an edge or line and applies a median filter along the direction with a minimum directional difference. For example, if the lowest operator $S_0$ is equal to the horizontal directional operator $D_h$ (box 520), the method 500 applies a horizontal median filter at box 522. If the lowest sorted operator $S_0$ equals the vertical directional operator $D_v$ (box 524), the method 500 applies a vertical median filter at box 526. If the lowest sorted operator $S_0$ equals the diagonal directional operator $D_d$ (box 528), the method 500 applies a diagonal median filter at box 530. If the lowest sorted operator $S_0$ equals the anti-diagonal operator $D_a$, the method applies an anti-diagonal median filter at box 532.

Put differently, if $S_0=D_h$, $p_{out}=\text{median}(p_{10},p_{11},p_{12})$.

Else if $S_0=D_v$, $p_{out}=\text{median}(p_{01},p_{11},p_{21})$.

Else if $S_0=D_d$, $p_{out}=\text{median}(p_{00},p_{11},p_{22})$.

Else (that is $S_0=D_a$), $p_{out}=\text{median}(p_{02},p_{11},p_{20})$.

The method 500 processes all pixels in the image in the same form. If it has not processed all pixels (box 534), it takes another sub image at step 510 and begins the analysis anew. The method 500 ends at box 536 once it has processed all pixels in the image.

Figure 6:
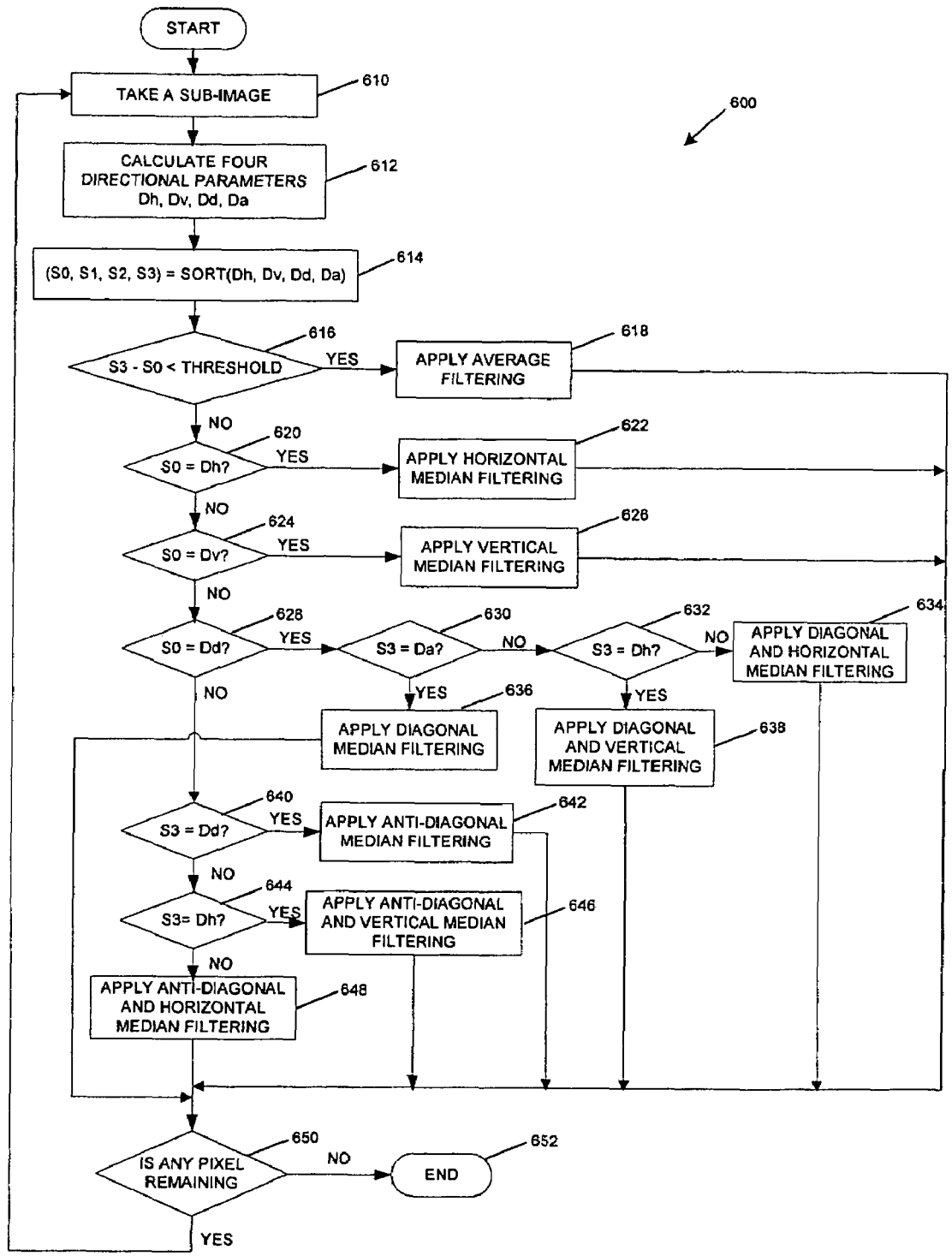
FIG. 6 is flowchart of another invention embodiment.

FIG. 6 is a flowchart of another embodiment according to the present invention. Referring to FIG. 6, the method 600 takes a sub image at box 610. The method 600 calculates a plurality of directional operators (box 612) corresponding to a plurality of directions, e.g., horizontal, vertical, diagonal, and anti-diagonal as described above with reference to FIG. 5. The method 600 sorts the plurality of directional operators at box 614 also as described above with reference to FIG. 5.

If $S_3-S_0<T$ (box 616), the method 600 determines no line or edge exists and applies an averaging or smoothing filter (box 618) as described above with reference to FIG. 5.

If $S_3-S_0 \geq T$ (box 616), the method 600 assumes the sub image includes an edge or line and applies a median filter along the direction with a minimum directional difference. If the lowest operator $S_0$ is equal to the horizontal directional operator $D_h$ (box 620), the method 600 applies a horizontal median filter at box 622. If the lowest sorted operator $S_0$ equals the vertical directional operator $D_v$ (box 624), the method 600 applies a vertical median filter at box 626.

If the lowest sorted operator $S_o$ equals the diagonal directional operator $D_d$ (box 628), the method 600 applies a diagonal median filter at box 636 if the highest sorted operator $S_3$ equals the anti-diagonal operator $D_a$ (box 630). If the lowest sorted operator $S_0$ equals the diagonal directional operator $D_d$ (box 628), the method 600 applies a diagonal and vertical median filter at box 638 if the highest sorted operator $S_3$ equals the horizontal operator $D_h$ (box 632). If the lowest sorted operator $S_0$ equals the diagonal directional operator $D_d$ (box 628), the method 600 applies a diagonal and horizontal median filter at box 634 if the highest sorted operator $S_3$ equals the vertical operator $D_v$.

If the lowest sorted operator $S_0$ equals the anti-diagonal directional operator $D_a$, the method 600 applies an anti-diagonal median filter at box 642 if the highest sorted operator $S_3$ equals the diagonal operator $D_d$ (box 640). If the lowest sorted operator $S_0$ equals the anti-diagonal directional operator $D_a$, the method 600 applies an anti-diagonal and vertical median filter at box 646 if the highest sorted operator $S_3$ equals the horizontal operator $D_h$ (box 644). If the lowest sorted operator $S_0$ equals the anti-diagonal directional operator $D_a$, the method 600 applies an anti-diagonal and horizontal median filter at box 648 if the highest sorted operator $S_3$ equals the vertical operator $D_v$.

Put differently, if $S_0=D_h$, $p_{out}=\text{median}(p_{10},p_{11},p_{12})$.

Else if $S_0=D_v$, $p_{out}=\text{median}(p_{01},p_{11},p_{21})$.

Else if $S_0=D_d$,
If $S_3=D_a$ $p_{out}=\text{median}(p_{00},p_{11},p_{22})$.

Else if $S_3=D_h$ $p_{out}=\text{median}(p_{00},p_{01},p_{11},p_{21},p_{22})$

Else $p_{out}=\text{median}(p_{00},p_{10},p_{11},p_{12},p_{22})$

Else (that is $S_0=D_a$),
If $S_3=D_a$ $p_{out}=\text{median}(p_{02},p_{11},p_{20})$.

Else if $S_3=D_h$ $p_{out}=\text{median}(p_{02},p_{01},p_{11},p_{21},p_{20})$

Else $p_{out}=\text{median}(p_{02},p_{10},p_{11},p_{12},p_{20})$.

The method 600 processes all pixels in the image in the same form. If it has not processed all pixels (box 650), it takes another sub image at step 610 and begins the analysis anew. The method 600 ends at box 652 once it has processed all pixels in the image.

Figure 9A:
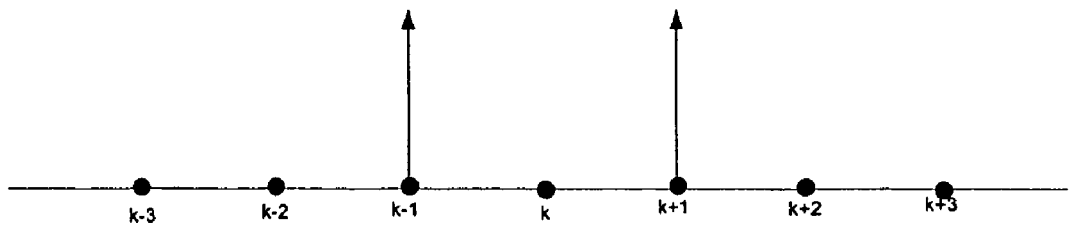
FIGS. 9A-9C are vertical line amplitude response diagrams.
Figure 9B:
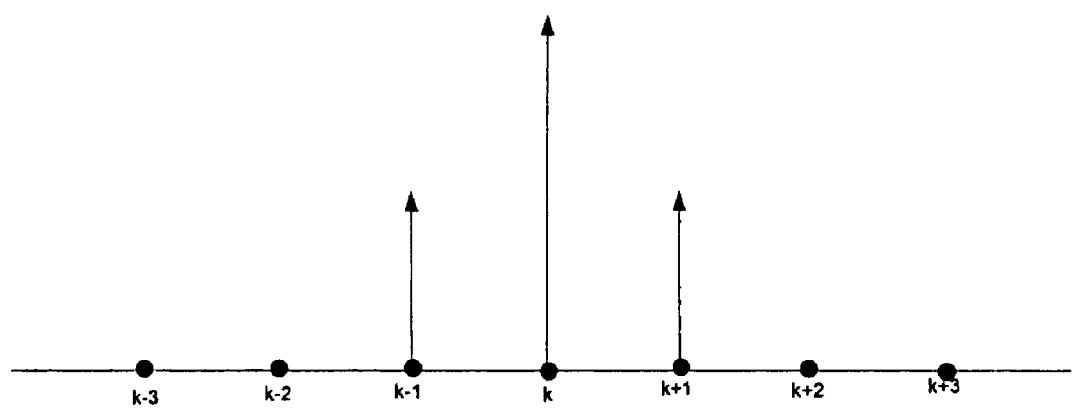
Figure 9C:
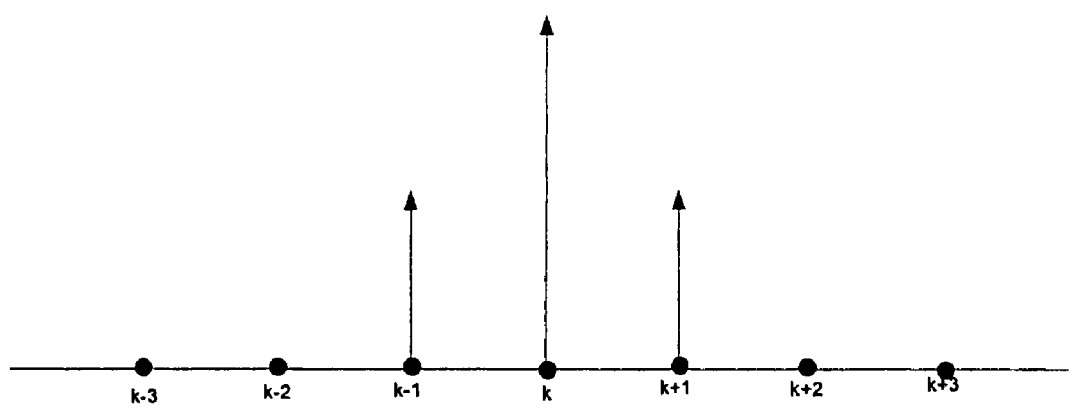

The directional operators of the present invention include the advantages of both Sobel masks and line detectors. FIGS. 9A-9C illustrate the response of the Sobel mask $S_v$, the line detector $L_v$, and the vertical directional operator $D_{max}-D_v$, respectively, for a vertical line located at k. The vertical directional operator $D_{max}-D_v$ possesses an equal response as the line detector $L_v$. Both the vertical directional operator $D_{max}-D_v$ and the line detector $L_v$ have a better response than the Sobel mask $S_v$ resulting in an improved ability to detect lines over Sobel masks.

Figure 10A:
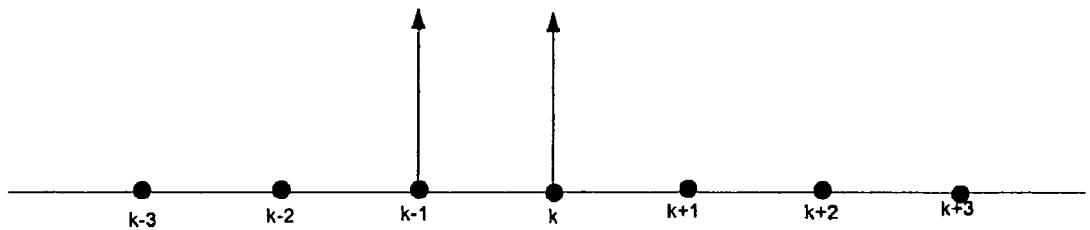
FIGS. 10A-10C are vertical edge amplitude response diagrams.
Figure 10B:
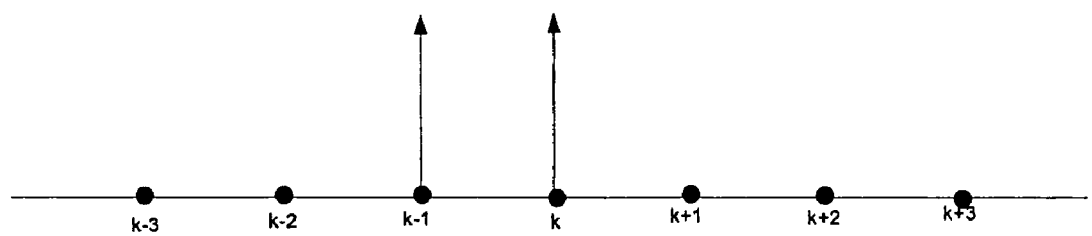
Figure 10C:
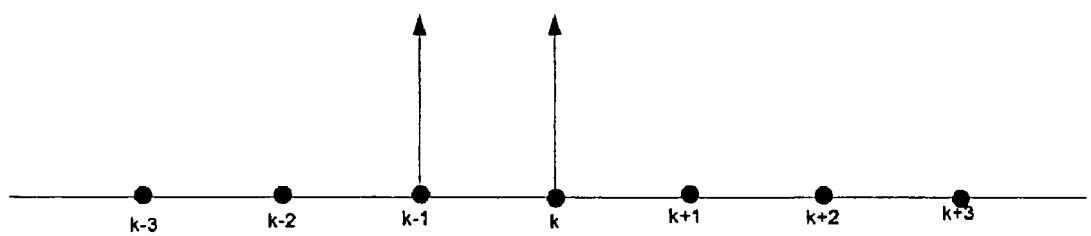

FIGS. 10A-10C illustrate the responses of the Sobel mask $S_v$, the line detector $L_v$, and the vertical directional operator $D_{max}-D_v$, respectively, to a vertical edge located at k—that is, pixels to the left of k have a first gray level, e.g., 0, and pixels to the right of k have a second gray level, e.g., 1. In this case, the Sobel mask $S_v$, the line detector $L_v$, and the directional operator $D_v$ have identical responses.

Figure 11A:
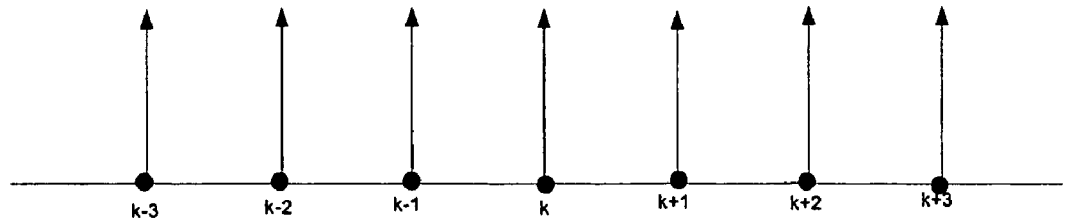
FIGS. 11A-11C are horizontal ramp amplitude response diagrams.
Figure 11B:
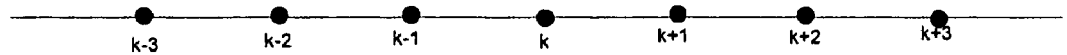
Figure 11C:
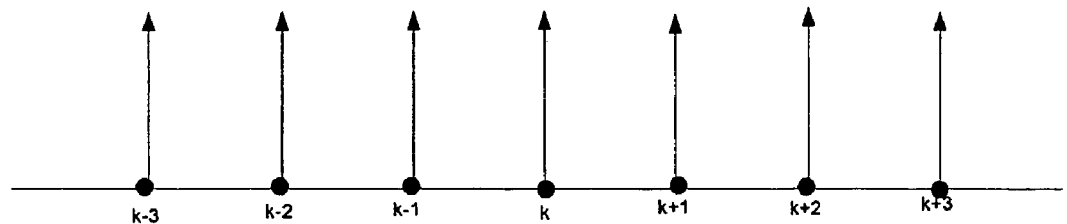

FIGS. 11A-11C illustrate the responses of the Sobel mask $S_v$, the line detector $L_v$, and the vertical directional operator $D_{max}-D_v$, respectively, for a horizontal ramp. Pixels in a horizontal ramp have the same gray level at the same horizontal position. A ramp, therefore, is considered to have a line structure as explained earlier. Here, the response of the vertical directional operator $D_{max}-D_v$ is equal to the Sobel mask $S_v$ response. They have peaks at every pixel. In contrast, the line detector $L_v$ has no response at all. A Sobel mask $S_v$ and the directional vertical operator $D_{max}-D_v$, therefore, can detect the vertical component of the horizontal ramp whereas the line detector cannot.

Referring back to FIG. 4, the four directional operators for the sub image are the following.

| | | | |
|---|---|---|---|
| $D_h = 128$ | $D_v = 102$ | $D_d = 22$ | $D_a = 40$. |

The directional operators of the present invention, therefore, correctly identify the diagonal as a line or edge in contrast to Sobel masks and line detectors.

Having illustrated and described the principles of our invention, it should be readily apparent to those skilled in the art that the invention can be modified in arrangement and detail without departing from such principles. I claim all modifications coming within the spirit and scope of the accompanying claims.

I claim:

1. A method comprising:
   determining absolute differences between pixels in an image;
   summing the absolute differences into at least one sum;
   applying at least one weight to the at least one sum to determine at least two weighted sums;
   comparing the at least two weighted sums to a predetermined threshold; and
   applying an image filter responsive to the comparing.

2. The method of claim 1 where determining includes taking the absolute differences of luminance or gray scale between the pixels in the image.

3. The method of claim 1 where determining includes taking the absolute differences on horizontal, vertical, diagonal, and anti-diagonal directions.

4. The method of claim 1 where comparing includes:
   identifying a highest and lowest of the at least two weighted sums;
   calculating a difference between the highest and the lowest of the at least two weighted sums; and
   comparing the difference with the predetermined threshold.

5. The method of claim 4 comprising:
   applying an averaging filter where the difference is less than the predetermined threshold; and
   applying a median filter responsive to the lowest weighted sum where the difference is not less than the predetermined threshold.

6. A method comprising:
   determining a plurality of differences between pixels in close proximity in an image;
   summing the plurality of differences to produce a plurality of sums;
   applying a weight factor from a plurality of weight factors to each of the sums to produce a plurality of weighted sums;
   summing the plurality of weighted sums to produce a plurality of directional operators;
   comparing the plurality of directional operators to a predetermined threshold; and
   applying an image filter responsive to the comparing.

7. The method of claim 6 where determining comprises:
   picking a sub image including a first target pixel and a plurality of pixels surrounding the first target pixel;
   taking a difference between the first target pixel and each surrounding pixel in a predetermined direction to produce a first group of the plurality of differences;
   summing the first group of the plurality of differences to produce a first group sum; and
   applying a first of the plurality of weight factors to the first group sum to produce a first weighted group sum.

8. The method of claim 7, comprising:
   picking a second target pixel in the sub image and at least one other surrounding pixel;
   taking a difference between the second target pixel and the at least one other surrounding pixel in the predetermined direction to produce a second group of the plurality of differences;
   summing the second group of the plurality of differences to produce a second group sum;
   applying a second weight factor to the second group sum to produce a second weighted group sum; and
   summing the first weighted group sum and the second weighted group sum to produce a directional operator of the plurality of directional operators in the predetermined direction.

9. The method of claim 7 where picking the sub image includes picking a 3 by 3 or a 3 by 5 image.

10. The method of claim 8 where applying the weight factors includes applying the first weight factor as $21/16$ and the second weight factor as $21/32$.

11. The method of claim 8 where taking differences includes taking absolute differences.

12. A method comprising:
    determining a directional difference between minimum and maximum directional operators in an image;
    comparing the directional difference to a predetermined threshold;
    applying an averaging filter where the directional difference is less than the predetermined threshold; and
    applying a median filter responsive to the minimum directional operator where the directional difference is not less than the predetermined threshold.

13. A method for noise reduction comprising:
    calculating a plurality of directional parameters in an image;
    sorting the plurality of directional parameters into an ordered list $(S_0, S_1, S_2, S_3)$ where $S_3 \geq S_2 \geq S_1 \geq S_0$;
    determining a line structure by analyzing the plurality of directional parameters; and
    applying a filter responsive to the determining.

14. The method of claim 13 where determining includes:
    calculating a difference between highest and lowest directional parameters; and
    comparing the difference with a predetermined threshold.

15. The method of claim 13 where calculating includes:
    calculating a vertical directional parameter responsive to a first and second weight;
    calculating a horizontal directional parameter responsive to the first and second weight;
    calculating a diagonal directional parameter responsive to a third and fourth weight; and
    calculating an anti-diagonal directional parameter responsive to the third and fourth weight.

16. The method of claim 15 where calculating includes calculating responsive to the first weight as $21/16$, the second weight as $21/32$, and the third and fourth weights as 1.

17. The method of claim 13 where calculating includes calculating a horizontal, vertical, diagonal, and anti-diagonal directional parameters.

18. The method of claim 13
    where determining comprises comparing a difference between a highest directional parameter and a lowest directional parameter to a predetermined threshold; and
    where applying comprises using a smoothing filter if the difference is less than the predetermined threshold.

19. The method of claim 18 where applying includes using a horizontal median filter, a vertical median filter, a diagonal median filter, or an anti-diagonal median filter responsive to the lowest directional parameter.

20. The method of claim 18 where applying includes:
    using a diagonal median filter responsive to the lowest and the highest directional parameters;
    using the diagonal and a vertical median filter responsive to the lowest and the highest directional parameters;
    using the diagonal and a horizontal median filter responsive to the lowest and the highest directional parameters;

using an anti-diagonal median filter responsive to the lowest and the highest directional parameters;

using the anti-diagonal and the vertical median filter responsive to the lowest and the highest directional parameters; and using the anti-diagonal and the horizontal median filter responsive to the lowest and the highest directional parameters.

21. An apparatus comprising:

means for calculating a plurality of directional operators in an image;

means for sorting the directional operators into an ordered list ($S_0$, $S_1$, $S_2$, $S_3$) where $S_3 \geq S_2 \geq S_1 \geq S_0$; and means for applying a filter responsive to the plurality of directional operators.

22. The apparatus of claim 21 where the means for applying comprises:

means for taking a difference between a highest directional operator and a lowest directional operator; and means for applying an averaging filter if the difference is less than a predetermined threshold.

23. The apparatus of claim 21 where the means for applying comprises:

means for applying an averaging filter responsive to a predetermined threshold; and means for applying a median filter responsive to a lowest directional operator and the predetermined threshold.

* * * * *